United States Patent Office 2,826,500
Patented Mar. 11, 1958

2,826,500

USE OF CATIONIC-MODIFIED UREA-FORMALDE-HYDE RESINS IN THE MANUFACTURE OF WET STRENGTH PAPER

Gerald I. Keim, Oxford, Pa., assignor to Hercules Powder Company, Wilmington, Del., a corporation of Delaware No Drawing. Application December 30, 1954
Serial No. 478,870

8 Claims. (Cl. 92—3)

This invention relates, in general, to the preparation of a treated paper and, in particular, to the preparation of a high-strength paper through the incorporation therewith of a cationic-modified urea-formaldehyde resin.

An ever important problem in the manufacture of paper is the preparation of a paper product having increased wet strength whereby the paper is resistant to tearing or breaking even when wet. Increased strength, particularly wet strength, has been imparted to paper through the incorporation in a paper furnish of a urea-formaldehyde resin, but previously the incorporation of such a resin in the paper furnish has been accomplished by precipitating the resin, or by utilizing a resin which has been partly polymerized and which is characterized by being in the gelled stage or nearly in the gelled stage with the result that the urea-formaldehyde resin is mechanically entrained in the paper fibers.

More recently, high wet strength and dry strength paper has been prepared by the addition thereto of a partially polymerized hydrophilic cationic urea-formaldehyde resin which contains as a modifier an alkylenepolyamine of the formula $H_2N(C_nH_{2n}HN)_xH$ in which $n$ is 2 or more and $x$ is one or more, such as ethylenediamine and 1,3-propylenediamine, polyalkylenepolyamines such as diethylenetriamine, triethylenetetramine, tetraethylenepentamine, the corresponding polypropylenepolyamines and polybutylenepolyamines; also guanidines, biguanides, the guanylureas and so forth. These modified resins are substantive to the paper fibers, i. e., they are characterized by substantial exhaustion onto the paper fibers and even distribution thereon without the need of addition of a precipitating or fixing agent.

Now in accordance with the present invention, a high wet-strength and dry-strength paper product is prepared by the addition thereto of a partially polymerized, hydrophilic urea-formaldehyde resin which contains as a modifier a mono- or bis-tetrahydro triazone compound selected from the group consisting of compounds of the formula

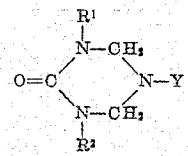

wherein $R^1$ and $R^2$ are hydrogen or hydroxyalkyl and Y is alkyl, hydroxyalkyl, or cycloalkyl, and compounds of the formula X—R—X wherein X is a group of the formula

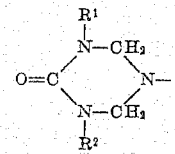

where $R^1$ and $R^2$ are the same as above, and R is selected from a class consisting of an alkylene group containing from 2 to 10 carbon atoms and a group of the formula

where $n$ is an integer from 1 to 4.

This cationic-modified urea-formaldehyde resin is incorporated in a paper furnish or applied to a paper web in the form of a relatively dilute resin sirup and is characterized by a substantive effect, i. e., characterized by substantial exhaustion onto the paper fibers and even distribution thereon without need for the addition of a precipitating or fixing agent such as, for example, alum or the like. Whether the resin is added to the paper furnish or applied directly to the paper web, the ultimate paper containing the resin is subjected to conditions which will effect curing of the resin to the water-insoluble state.

In making the paper-treating resin, the ingredients, in suitable proportions and under suitable conditions, are reacted together until a resin useful for the purposes of the invention is obtained. Various detailed procedures may be used as will be apparent from the examples and description hereinafter given. Regardless of the procedure by which the resin is prepared, it may be added directly to a paper furnish at a pH between about 4 and about 9. It has been found that between these pH limits the resin is substantive with respect to paper fibers and a high percentage of the resin will be retained by the paper fibers.

Having described the general nature and form of the invention, the following examples are given to illustrate the preparation of specific cationic-modified urea-formaldehyde resins and their use and effectiveness in the preparation of wet-strength papers. In each case, the specific triazone modifier utilized was prepared in accordance with the method disclosed in U. S. 2,641,584 and was used in the form of the reaction solution thus obtained. This reaction solution, in each case, contained about 40% of the triazone, the remainder consisting of water and small amounts of unreacted formaldehyde. Viscosity values given have reference to the viscosity on the Gardner-Holdt scale of an aqueous solution of the resin (45% solids) at 25° C. unless otherwise specified. Parts are by weight unless otherwise indicated.

EXAMPLE 1

A tetrahydro-5-hydroxyethyl-s-triazin-2(1H)-one modified urea-formaldehyde resin was prepared using the following formulation:

| | Parts |
|---|---|
| Urea | 80 |
| 37% formaldehyde | 224 |
| Guanidine hydrochloride | 9 |
| Tetrahydro - 1,3-dimethylol-5-hydroxyethyl-s-triazin-2(1H)-one solution | 120 |

The above ingredients were mixed and the pH of the solution adjusted to 8.5–9.0 with 10% sodium hydroxide. The mix was heated to reflux for 30 minutes and then the pH was adjusted to 2.8–3.0 with 90% formic acid. After refluxing for an hour the pH of the solution was 4.5 and the viscosity (Gardner-Holdt) was B. The pH was adjusted to 3.0 and the solution was cooled to 80° C. After about 3 hours at this temperature, the resin viscosity had reached U (Gardner-Holdt). One hundred parts of water and three parts of 10% sodium hydroxide were added and the solution was cooled to 25° C. The final pH was 7.3. The product was infinitely water dilutable.

Bleached sulfate pulp was beaten to a Schopper-Riegler freeness of 750 cc. The stock was then diluted to an 0.1% consistency, alumed to pH 4.5 and 1% by weight of the above resin (solids basis) based on the dry weight of the pulp, added. The pulp was then formed into hand sheets with a basis weight of 40 pounds per ream. These were dried on a rotary drum dryer to a moisture content of 5%. Part of the sheets were given an extra cure of one hour at 105° C. One-inch strips were cut from the above paper and soaked in distilled water for two hours after which their tensile was determined. The results are listed in Table I.

*Table I*

| Resin Evaluated | Type Cure | Wet Tensile, Lbs./inch |
| --- | --- | --- |
| Resin from Example 1 | Off Machine | 4.5 |
|  | 1 hr. at 105° C | 9.0 |
| No resin | Off Machine | 0.98 |
|  | 1 hr. at 105° C | 1.5 |

EXAMPLE 2

An ethylenebis(tetrahydro - 3,5 - dimethylol - s - triazin - 4(3H) - one) modified urea - formaldehyde resin was prepared using the following formulation:

|  | Parts |
| --- | --- |
| Urea | 120 |
| 37% formaldehyde | 320 |
| Ethylenebis(tetrahydro - 3,5 - dimethylol - s - triazin-4(3H)-one) solution | 240 |

The above ingredients were mixed and charged to a polymerization kettle. The pH of the solution was 7.94. The solution was heated to boiling under a reflux condenser and then cooled to slightly below its boiling point, following which 4.5 parts of 90% formic acid was added. This reduced the pH of solution to 3.45. The solution was again heated to reflux and held there for about two hours at which time the viscosity of the solution had reached U on the Gardner-Holdt scale. One hundred fifty parts of water was then added and the solution was cooled to 25° C. The pH of the solution was adjusted to 7.2 for storage. The resulting stable resin sirup was infinitely dilutable with water.

The resin sirup was used to prepare a high wet-strength and high dry-strength paper utilizing the procedure of Example 1. A like procedure was used in preparing paper but without the addition of the resin. The results obtained are set forth in Table II.

*Table II*

| Resin Evaluated | Type Cure | Wet Tensile, Lbs./inch |
| --- | --- | --- |
| Resin from Example 2 | Off Machine | 4.7 |
|  | 1 hr. at 105° C | 8.2 |
| No resin | Off Machine | 0.98 |
|  | 1 hr. at 105° C | 1.5 |

EXAMPLE 3

One hundred twenty parts of urea was dissolved in 320 parts of 37% formaldehyde. To this was added 120 parts of tetrahydro - 1,3 - dimethylol - 5 - methyl - s - triazin-2(1H)-one solution containing 48 parts of the triazone, and 9 parts of guanidine hydrochloride. The pH of this solution was raised to 7.5 by the addition of 10% sodium hydroxide. This solution was then transferred to a polymerization flask, heated to reflux and held at this temperature for 5 minutes. The pH was then adjusted to approximately 3 by the addition of 90% formic acid and after refluxing for one hour the solution was gradually cooled over a period of three hours to about 50° C. at which time the viscosity of the resin had increased to >T measured by the Gardner bubble type viscometer. One hundred ten parts of water and 10 parts of 10% sodium hydroxide were added and the resin cooled to 25° C. The product contained 30.2% total solids and had a pH of 7.3.

EXAMPLE 4

Eighty parts of urea was dissolved in 214 parts of 37% formaldehyde. To this was added 190 parts of a solution of tetrahydro-1,3-dimethylol-5-hydroxyethyl-s-triazin-2(1H)-one. The pH of the resulting solution was adjusted to 8.6 with 10% sodium hydroxide following which the solution was transferred to a polymerization flask, refluxed for 45 minutes and then adjusted to pH 3.4 with 90% formic acid. During the next hour the pH was maintained between 3.6 and 3.8 by the addition of small quantities of 90% formic acid, during which the solution was maintained at reflux. Then the temperature was gradually reduced over a period of 1.5 hr. to 75° C.; at the end of this time the viscosity of the resin had increased to >U, Gardner scale. At this point 130 parts of water and 10 parts of 10% sodium hydroxide was added and the resin was cooled to 25° C. The product contained 28.7% solids and had a final pH of 7.2.

EXAMPLE 5

One hundred twenty parts of urea was dissolved in 310 parts of 37% formaldehyde. To this was added 120.6 parts of tetrahydro-1,3-dimethylol-5-dimethylaminopropyl-s-triazin-2(1H)-one solution. The solution was adjusted to a pH of 8.7 with 10% sodium hydroxide and transferred to a polymerization flask equipped with reflux condenser, mechanical stirrer, and thermometer. The charge was heated to reflux in 15 minutes and held at this temperature for an additional 5 minutes, after which it was adjusted to pH 4.0 with 90% formic acid. The solution was heated at reflux for an additional 2 hours and at the end of this period the viscosity of the resin had increased to U-V, Gardner scale. One hundred fifty parts of water and 10 parts of 10% sodium hydroxide were then added to the resin solution and it was cooled to 25° C. The product had a final pH of 7.2.

EXAMPLE 6

One hundred twenty parts of urea was dissolved in 320 parts of 37% formaldehyde. Then 260 parts of a solution of ethylenebis(tetrahydro - 3,5 - dimethylol - s - triazin-4(3H)-one) was added. This solution was transferred to a polymerization flask equipped with mechanical stirrer, reflux condenser, and thermometer, heated to reflux, and kept at this temperature for 10 minutes. The pH of the solution was then adjusted to 3.6 with 90% formic acid and the solution was then maintained at reflux temperature for 2 hours and 40 minutes. During this time the pH was kept between 3.6 and 5.5 by the addition of small quantities of 90% formic acid. At the end of this time the viscosity of the solution had increased to greater than U on the Gardner scale. The reaction was stopped at this point by adding 150 parts of water plus 5 parts of 10% sodium hydroxide, and the solution was cooled to 25° C. The pH of the product was adjusted to 7.2. Solids content of this solution was 34.4%.

EXAMPLE 7

One hundred twenty parts of urea was dissolved in 320 parts of 37% formaldehyde. To this was added 140 parts of a solution of ethylenebis(tetrahydro-3,5-dimethylol-s-triazin-4(3H)-one). The mix was transferred to a polymerization flask equipped with mechanical stirrer, reflux condenser, and thermometer. Heat was applied and the solution was heated to reflux. It was maintained at this temperature 10 minutes and the pH then adjusted to 4.2 with 90% formic acid. The solution was refluxed for 3 hours and during this time the pH was maintained between 4.2 and 6.5 by the addition of small quantities of 90% formic acid. At the end of this time the viscosity of the solution had increased to X–Y, Gardner scale. At this point the reaction was stopped by the addition of 200 parts of water and 2 parts of 10% sodium hydroxide. When the resin had been cooled to room temperature, 25° C., the pH was adjusted to 7.2 with 10% sodium hydroxide. The product contained 29.7% solids.

EXAMPLE 8

Eighty parts of urea was dissolved in 203 parts of 37% formaldehyde. To this was added 162 parts of a solution of ethylenebis(tetrahydro-3,5-dimethylol-s-triazin-4(3H)-one). The pH of this solution was 8.7. It was transferred to a polymerization flask equipped with mechanical stirrer, reflux condenser, and thermometer. The solution was then heated to reflux and held at this temperature 5 minutes, after which the pH was adjusted to 5.4 with 90% formic acid. The solution was maintained at reflux for 1 hour and 45 minutes, during which the pH was maintained between 5.4 and 6.5 by the addition of small quantities of 90% formic acid. At the end of this time the viscosity of the solution had increased to W, Gardner scale. The reaction was stopped by the addition of 160 parts of water and 6 parts of 10% sodium hydroxide. The solution was then cooled to room temperature and the pH of the resin was finally adjusted to 7.2 with 10% sodium hydroxide. The solids content of this resin solution was 32.2%.

EXAMPLE 9

Eighty parts of urea was dissolved in 224 parts of 37% formaldehyde. To this was added 120 parts of a solution of tetrahydro-1,3-dimethylol-5-hydroxyethyl-s-triazin-2-(1H)-one and 9 parts of guanidine hydrochloride. This solution was transferred to a polymerization flask equipped with mechanical stirrer, reflux condenser, and thermometer. Heat was applied and the mixture was heated to reflux for 30 minutes and then adjusted to pH 2.8–3.0 with formic acid. The solution was kept refluxing for another hour at which time the pH was about 4.5 and the viscosity of the solution was about B, Gardner scale. The pH of the resin was then adjusted to 3.0 with 90% formic acid and cooled to 80° C., where it was held for about 3 hours until the resin viscosity reached U, Gardner scale. Then the reaction was stopped by adding 100 parts of water and 3 parts of 10% sodium hydroxide. The resin was then cooled by means of an ice bath to 25° C. The product had a final pH of 7.2. The solids content of this resin solution was 30%.

A portion of each of the resins from Examples 3 to 9 inclusive was added to bleached Kraft pulp, beaten to a Schopper-Riegler freeness of 750 cc. This pulp was then converted to hand sheets on a Noble and Wood laboratory handsheet machine. The basis weight of the hand sheets was 40 pounds per 3,000 sq. ft. They were cured for one hour at 105° C., then soaked in distilled water for two hours at 25° C. The tensile strength of the soaked sheets was then determined with an Amthor tensile tester. The results are set forth in Table III wherein the percent resin added is based on the dry weight of the pulp.

*Table III*

| Resin from— | Percent Resin Added (Solids Basis) | Wet Tensile, Lb./inch |
| --- | --- | --- |
| Example 3 | 1 | 5.7 |
| Example 4 | 1 | 5.6 |
| Example 5 | 1 | 8.5 |
| Example 6 | 1 | 7.7 |
| Example 7 | 1 | 9.5 |
| Example 8 | 1 | 10.1 |
| Example 9 | 1 | 9.2 |
| No resin | 0 | 1.5 |

The agent which is utilized according to this invention to impart increased wet strength and dry strength to a paper product comprises a urea-formaldehyde resin containing a small proportion of the indicated type of mono- or bis-tetrahydro triazone compound as a modifier. Typical examples of the tetrahydro triazone compounds which may be employed are as follows: tetrahydro-5-methyl-s-triazin-2(1H)-one, tetrahydro-5-hydroxyethyl-1,3-dimethylol-s-triazin-2(1H)-one, tetrahydro-5-methyl-1,3 - dimethylol - s - triazin - 2(1H) - one, tetrahydro-1,3 - dimethylol - 5 - dimethylaminopropyl - s - triazin-2(1H)-one, and ethylenebis(tetrahydro-3,5-dimethylol-s-triazin-4(3H)-one).

The above and other triazone compounds suitable for carrying out the purposes of the invention may desirably be prepared in accordance with the methods and procedures set forth in U. S. 2,641,584 to Thomas A. Martone, Jr., dated June 9, 1953. As therein disclosed, urea, formaldehyde and a primary amine are reacted together in suitable proportions in mildly alkaline solution. In a representative and preferred preparation, for example, one mole of diethylene triamine, three moles of urea and six moles of formaldehyde are reacted together at a temperature from 80°–85° C. in an aqueous solution adjusted with sodium carbonate to a pH of 8.5–9. This mixture is cooled to 60° C. and four additional moles of formaldehyde are added to form a methylol derivative of the triazone compound.

Triazone compounds suitable for use herein may also be prepared in accordance with the methods and procedures set forth in U. S. Patent 2,304,624 to William James Burke wherein the ingredients are reacted at a temperature of 25 to 100° C. for a period of 1 to 24 hours. Most of the solvent may then be removed by distillation under reduced pressure, the reaction mixture cooled, and the resulting crystalline product removed by filtration.

The triazone compounds may be prepared using primary monoamines and particularly a member of the class of primary monoamines consisting of the lower alkyl monoamines, such as methylamine, ethylamine, propylamine, isopropylamine, n-butylamine and n-hexylamine; the lower hydroxyalkyl monoamines such as ethanolamine and isopropanolamine; and the cycloalkyl monoamines such as cyclopentylamine and cyclohexylamine.

These triazone compounds may also be prepared using as the primary amine a linear polyamine containing from 2 to 8 carbon atoms, 2 primary amino groups, and from 0 to 3 secondary amino groups, the nitrogen atoms in the polyamine being separated by at least 2 carbon atoms from one another.

In preparing the triazone compounds, the urea and formaldehyde may first be heated together and the primary amine be added thereafter or all three ingredients may be added simultaneously. Furthermore, in the case of the methylolated compounds, instead of adding the extra quantity of formaldehyde needed to form the methylol groups after the formation of the triazone rings, the entire amount of formaldehyde may be added originally.

The tetrahydro triazone compounds, prepared as briefly described above, and as more fully described in the aforementioned patents, may be utilized as modifiers for urea-formaldehyde resins without separation from the crude reaction mixtures in which formed or alternately may be recovered and purified in any suitable manner. The amount of the modifying compound employed may vary from about 10% to about 100% by weight of the urea. The formaldehyde is usually employed in an amount from about 1.8 moles to about 2.4 moles per mole of urea although this range is not to be considered as critical but merely expressive of optimum conditions.

In the employment of the monocyclic tetrahydro triazone compounds as modifiers, optimum results are obtained by the inclusion of guanidine hydrochloride in an amount from about 0.02 to about 0.1 mole per mole of urea. The advantage of such inclusion will be apparent from a comparison of Examples 4 and 9. Thus in Example 4 which involved the use of a monocyclic tetrahydro triazone compound without guanidine hydrochloride, the wet tensile in lb./inch was 5.6. However, the addition of 9 parts guanidine hydrochloride as in Example 9 caused the wet tensile in lb./inch to increase to 9.2. Moreover, the inclusion of the guanidine hydrochloride not only improves the efficiency of the monocyclic triazone modified resins, but also their dilutability (solubility) in cold water. Therefore, in the use of the monocyclic tetrahydro triazone compounds it is preferred to include guanidine hydrochloride in the amounts specified.

The novel cationic modified ureaformaldehyde resins may be prepared in a variety of ways. It is preferred to mix all the ingredients together and then heat them, first for a short period of time under alkaline conditions, and then for a relatively long period of time under acid conditions until a resin sirup of relatively low viscosity is formed. If desired, the alkaline reaction may be omitted and the entire reaction carried out under acid conditions. Alternatively, the urea and formaldehyde may be partially polymerized under alkaline conditions followed by subsequent addition of the modifier coupled with adjustment of the pH to the acid side for a second stage of polymerization.

In any case the polymerization, or at least the last step thereof, is carried out at an acid pH between about pH 2.5 and about pH 6, preferably about pH 4. Various strongly acidic substances may be added to obtain the desired pH such as hydrochloric acid, sulfuric acid, formic acid, etc. Formic acid is preferred.

The preferred temperature for the polymerization under acid conditions is the reflux temperature. However, it can be carried out at any temperature between about 40° C. and about 105° C.

The polymerization is continued until a resin of the desired viscosity is obtained. In accordance with the invention it has been found that optimum results, i. e., increase in wet strength of paper, is obtained if polymerization is continued until the viscosity of the resin at 45% solids and 25° C. is greater than about K on the Gardner-Holdt scale. Preferred viscosities, at 45% solids and 25° C., are from about T to about Z on the Gardner-Holdt scale. The upper limit of viscosity is that just short of gelation.

The polymerization is stopped at the desired viscosity by the addition of an alkaline material such as caustic soda until a pH of about 7 is reached. The resulting clear, somewhat viscous liquid is relatively stable and can be stored for substantial lengths of time without a detrimental amount of additional polymerization or other deterioration either with or without added materials such as, for example, stabilizers, additives or the like. The resins so produced are highly water-soluble, are capable of infinite dilution and are thermosetting.

The resin formed according to this invention is characterized both by ready solubility in water which permits easy mixing with a paper furnish to accomplish substantially uniform incorporation of the resin therein, and the resin is further characterized by being substantially adsorbed from its aqueous solutions onto the cellulosic paper fibers. Thus, whereas in some previous methods it has been conventional to incorporate a ureaformaldehyde type of synthetic resin with paper fibers through mechanical entrainment thereof or to add a precipitating agent to fix the resin on the fiber, in the case of the present resin, attachment to the fibers is accomplished by mutual attraction between the negatively charged cellulose fibers and the positively charged (cationic) resin particles. Through the incorporation of this resin in a paper furnish at a pH between about 4 and about 9 and preferably at a pH between about 4 and about 7, there results incorporation of the resin material in the final paper product without reliance on mechanical entrainment or precipitation. While the resins described herein are substantive to cellulose fibers over the pH between about 4 and about 9, it is only within the pH range from about 4 to about 7 that the resins can be cured. Hence, the latter range constitutes the useful range for the production of paper of high wet strength.

As indicated in the broad statement of the invention, the ultimate paper or paper product containing the resin is subjected to conditions which will effect curing of the resin to the water-insoluble state. In the event the resin is added to a paper furnish, as for example in the beater, the treated fibers are formed into a sheet on the wire or cylinder of the papermaking machine. As part of the papermaking process this felted sheet is heated to dry it. 212° F. is a representative temperature for this stage of the process. The sheet is generally maintained at this temperature for a minute or more to effect the necessary drying. At the same time the resin is cured to the water-insoluble state—at least to such an extent as to provide the desired increase in wet and dry strength. The dry paper may be heated for additional periods of time at elevated temperatures, preferarbly 212° F. and above, to effect further curing of the resin and consequent increase in wet strength, if desired. Even storage of the paper at room temperature will effect some further curing of the resin. In the event the resin is applied to a preformed paper or paper product by tub application methods, the treated web should be heated at say 212° F. or above for 1 or more minutes to develop wet and dry strength therein.

The necessary qualities of the tetrahydro triazone modified ureaformaldehyde resin, namely, its ability to exhaust from aqueous solution onto cellulosic fibers and to impart to a paper product prepared therefrom a high degree of wet and dry strength, are dependent on the ingredients chosen and the proportions. For example, the use of unmodified ureaformaldehyde resin or the use of a ureaformaldehyde resin containing modifiers other than the tetrahydro triazones herein disclosed do not satisfy the needs as does the tetrahydro triazone modified resin. In some instances the resins are not substantive, thus requiring other methods to provide adequate retention of the resin in the paper, or alternatively, even those resins related in chemical composition and physical properties and adequately retained in the paper are characterized by providing significantly less, if any, increase in strength properties of the paper product.

While the urea in the cationic modified urea-formaldehyde resin is a preferred material it may be replaced by closely related materials, such as thiourea or the like, and may be replaced in part by numerous materials such as melamine, thiourea, guanidine, aminoguanidine, diamines, and the like. As a matter of fact, as hereinabove pointed out, the replacement of part of the urea with guanidine is a preferred procedure when utilizing a monocyclic triazone modifier. By the same token, the formaldehyde may be wholly or partially replaced by formaldehyde-generating materials, such as paraformaldehyde and the like, and may be replaced in part by closely related materials such as acetaldehyde, glyoxal, and the like. The modified resins obtained from these materials, together with a tetrahydro triazone in the desired proportions, are characterized by the necessary properties of ready exhaustion from aqueous solution onto cellulosic fibers to impart to a paper product prepared therefrom an increased wet and dry strength.

The use of a relatively small amount of the resin, for example, about 0.1% by weight (solids basis) based on weight of dry pulp imparts a significant degree of dry strength and wet strength to a paper treated therewith. The improvement in strength properties increases sharply with the addition of amounts of the resin up to about 6%, by weight (solids basis) based on weight of dry pulp, after which point the addition of further amounts of the resin provide a satisfactory product but with less striking improvement resulting from the incorporation of additional amounts of material. The high satisfactory wet- and dry-strength paper product which is desired is obtained through the use of amounts of the resin up to as high as about 15% by weight (solids basis) based on weight of dry pulp, with a preferred range of about 0.25% to about 6% by weight (solids basis) based on weight of dry pulp. Thus, for example, utilizing a resin according to this invention in an amount of about 1% by weight (solids basis) based on the weight of pulp, there is obtained an improved paper product characterized by having substantially increased strength both in the wet and in the dry state.

Variations in the methods for applying the resin material to the paper are available through variations of the condition of the paper furnish at the time of treatments, such as, for example, by variations of pH, concentration or the like. Furthermore, variations are available through the selection of a point of addition which is most convenient for the actual manufacturing needs such as, for example, by addition of the resin to the paper furnish at any point prior to sheet formation such as, for example, addition at the head box, fan pump, beater engine, Jordan, or the like. Likewise, as previously pointed out, the resin may be utilized either alone over a wide pH range or with conventional papermaking ingredients such as, for example, sizing compositions and the like, to provide in all cases a paper product having the desired increased dry- and wet-strength properties.

The utility of this invention is not limited to the particular type of paper pulp used, and, accordingly, applicant's invention may be utilized with the various types of kraft, soda, sulfite pulp, and the like as well as with the various chemical, semichemical, and mechanical paper pulps. By the same token, the invention may be utilized with various types of paper products such as paper, fiber board, molded pulp products, and the like. In all instances, the product produced by applicant's invention is characterized by having an increased dry strength and wet strength, by being relatively resistant to abrasion, and by having a surface of improved printing properties and the like.

The cationic modified urea-formaldehyde resins used in the process of this invention may be used in the form of resin sirups, or they may be vacuum dried and used as a dry powder. This dry powder may be dissolved either in water or in dilute formic or acetic acids and added to a paper furnish as a solution, or it may be added to the furnish at some point sufficiently far away from the point of sheet formation to permit resolubilization of the powder.

What I claim and desire to protect by Letters Patent is:

1. A method of producing wet-strength paper which comprises applying to the fibers thereof from about 0.1% to about 15% by weight (solids basis), based on the weight of the pulp, of a partially polymerized, hydrophilic, cationic tetrahydro triazone modified urea-formaldehyde resin, said resin being a reaction product of urea, from about 1.8 to about 2.4 moles of formaldehyde per mole of urea and from about 10% to about 100% by weight, based on the weight of urea, of a tetrahydrotriazone compound selected from the class consisting of compounds of the formula

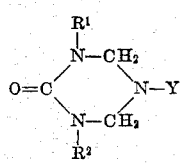

wherein $R^1$ and $R^2$ are selected from the group consisting of hydrogen and hydroxyalkyl and Y is selected from the group consisting of alkyl, hydroxyalkyl and cycloalkyl, and compounds of the formula X—R—X wherein X is a group of the formula

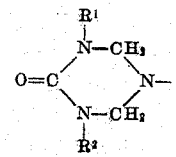

where $R^1$ and $R^2$ are the same as above, and R is selected from a class consisting of an alkylene group containing from 2 to 10 carbon atoms and a group of the formula —$(CH_2CH_2NH)_nCH_2CH_2$— where $n$ is an integer from 1 to 4.

2. The method of claim 1 in which the resin is employed in the amount of from about 0.25% to about 6% by weight (solids basis) based on the dry weight of the fibers.

3. The method of claim 1 in which the tetrahydro triazone compound constitutes from about 10% to about 100% by weight of the urea.

4. The method of claim 3 in which the tetrahydro triazone is a tetrahydro-3,5-dimethylol-5-alkyl-s-triazin-2(1H)-one.

5. The method of claim 3 wherein the tetrahydro triazone compound is ethylenebis(tetrahydro-3,5-dimethylol-s-triazin-4(3H)-one).

6. A wet strength paper comprising a web of cellulosic fibers having incorporated therewith from 0.1% to about 15% by weight, based on the weight of the fibers, of a partially polymerized, hydrophilic, cationic tetrahydro triazone modified, urea-formaldehyde resin, said resin being a reaction product of urea, from about 1.8 to about 2.4 moles of formaldehyde per mole of urea and from about 10% to about 100% by weight, based on the weight of urea, of a tetrahydrotriazone compound selected from the class consisting of compounds of the formula

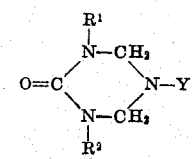

wherein $R^1$ and $R^2$ are selected from the group consisting of hydrogen and hydroxyalkyl and Y is selected from the group consisting of alkyl, hydroxyalkyl and cycloalkyl, and compounds of the formula X—R—X wherein X is a group of the formula

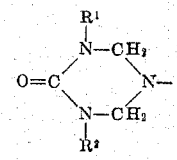

where $R^1$ and $R^2$ are the same as above, and R is selected from a class consisting of an alkylene group containing from 2 to 10 carbon atoms and a group of the formula —$(CH_2CH_2NH)_nCH_2CH_2$— where $n$ is an integer from 1 to 4.

7. A method for the production of wet-strength paper which comprises adding to an aqueous suspension of cellulosic paper stock a partially polymerized, hydrophilic, cationic urea-formaldehyde tetrahydro triazone resin, said resin being a reaction product of urea, from about 1.8 to about 2.4 moles of formaldehyde per mole of urea and from about 10% to about 100% by weight, based on the weight of urea, of a tetrahydrotriazone compound, said triazone compound being selected from the class consisting of compounds of the formula

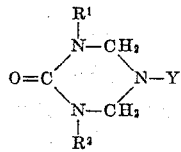

wherein $R^1$ and $R^2$ are selected from the group consisting of hydrogen and hydroxyalkyl and Y is selected from the group consisting of alkyl, hydroxyalkyl and cycloalkyl, and compounds of the formula X—R—X wherein X is a group of the formula

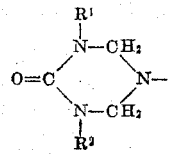

where $R^1$ and $R^2$ are the same as above, and R is selected from a class consisting of an alkylene group containing from 2 to 10 carbon atoms and a group of the formula —$(CH_2CH_2NH)_n CH_2CH_2$— where $n$ is an integer from 1 to 4, adsorbing from about 0.1% to about 15% by weight (solids basis) based on the weight of dry pulp, of said resin on the paper stock, forming the stock so treated into a waterlaid sheet and heating the sheet and thereby forming a bond of cured resin between the fibers thereof.

8. The method of claim 7 in which the amount of resin adsorbed on the paper stock is from about 0.25% to about 6% by weight (solids basis) based on the dry weight of pulp.

References Cited in the file of this patent

UNITED STATES PATENTS

| | | |
|---|---|---|
| 2,197,357 | Widmer et al. | Apr. 16, 1940 |
| 2,291,080 | Hofferbert | July 28, 1942 |
| 2,338,602 | Schero | Jan. 4, 1944 |
| 2,485,203 | Kvalnes et al. | Oct. 18, 1949 |
| 2,626,251 | James | Jan. 20, 1953 |
| 2,632,700 | Niles | Mar. 24, 1953 |
| 2,641,584 | Martone | June 9, 1953 |
| 2,729,617 | Davidson | Jan. 3, 1956 |

FOREIGN PATENTS

| | | |
|---|---|---|
| 468,512 | Canada | Oct. 3, 1950 |